United States Patent [19]
Schneider

[11] Patent Number: 5,213,546
[45] Date of Patent: May 25, 1993

[54] ANTI-SHUDDER TRIPOD CONSTANT VELOCITY JOINT

[75] Inventor: Dean J. Schneider, Highland, Mich.

[73] Assignee: GKN Automotive, Inc., Auburn Hills, Mich.

[21] Appl. No.: 776,827

[22] Filed: Oct. 15, 1991

[51] Int. Cl.$^5$ ............................................. F16D 3/205
[52] U.S. Cl. .................................. 464/111; 464/124; 464/132; 464/905
[58] Field of Search ............... 464/111, 123, 124, 132, 464/905

[56] References Cited

U.S. PATENT DOCUMENTS

| | | | |
|---|---|---|---|
| 3,490,251 | 1/1970 | Roethlisberger | 464/124 |
| 4,129,016 | 12/1978 | Olson, Sr. | 464/131 X |
| 4,192,154 | 3/1980 | Nakamura et al. | 464/111 |
| 4,472,156 | 9/1984 | Orain | 464/111 |
| 4,505,521 | 3/1985 | Teramachi | 384/44 |
| 4,565,540 | 1/1986 | Orain | 464/111 |
| 4,589,856 | 5/1986 | Mazziotti et al. | 464/111 |
| 4,684,356 | 8/1987 | Kimata et al. | 464/111 |

Primary Examiner—Joseph J. Hail, III
Assistant Examiner—William G. Battista, Jr.
Attorney, Agent, or Firm—Harness, Dickey & Pierce

[57] ABSTRACT

A tripod joint separates the internal components of the joint responsible for angular and plunging movement of the joint. The tripod joint comprises an outer race, a spider having three radially extending trunnions, three rollers and a plurality of barrel shaped rollers. The barrel shaped rollers are disposed between the outer rollers and a respective trunnion located on the spider. Plunging movement of the joint either at 0° joint angle or when the joint is at an angle is accommodated by a rolling action of the rollers against the outer race. Angular movement is accommodated by sliding movement of the barrel shaped rollers against an adjacent component or by the outer rollers against the outer race.

6 Claims, 5 Drawing Sheets

ANTI-SHUDDER TRIPOD CONSTANT VELOCITY JOINT

BACKGROUND OF THE INVENTION

The invention relates to universal joints. More particularly the invention relates to tripod constant velocity universal joints.

Front wheel drive vehicles with independent front wheel suspension use a pair of halfshaft assemblies to transmit power between the vehicle's engine and the front wheels.

Typically these halfshaft assemblies comprise a fixed joint at one end and a plunging joint at the opposite end. These joints are connected by an interconnecting shaft.

The fixed joint is typically positioned at the wheel side of the vehicle. These joints are deigned to high angle (45°-50°) operation. The fixed joints allow the vehicles front wheels to turn in order for the vehicle to negotiate corners. The center of angulation of the fixed joints is constant.

The plunging joint is typically positioned at the transmission or transaxle side of the vehicle. These joints are designed for lower angulation (20°-25°). The center of angulation of these joints is not fixed but is allowed to move axially (plunge) along the axial center line of the joints outer member. This capability of angulation and plunge movement allow the joint to transmit power while at the same time accommodating suspension and engine movement.

A tripod joint is one design of a plunging constant velocity joint. A tripod joint comprises an outer member with three circumferentially spaced longitudinal chambers. Disposed within these chambers is a spider assembly. The spider assembly comprises an inner member with three circumferentially spaced radially extending trunnions. Each trunnion is surrounded by a roller. A plurality of needle bearings are journaled between the roller and the trunnion. This permits free rolling of the roller on the trunnion. The outer surface of the roller is in contact with the sides of the longitudinal chambers of the outer member.

When the tripod joint is at a 0° angle, the plunging effort is relatively low. The roller rolls against the longitudinal chamber of the outer member and rotates on the trunnion of the inner member using the plurality of needle bearings.

When the tripod joint is operated at an angle, the tripod roller is not free to roll along the track because the plane of the tripod roller is skewed relative to the plane of the outer member's chamber. This skewed relationship causes the roller to both roll and slide along the longitudinal chamber. As the joint angle increases, the amount of sliding also increases.

The sliding action of the roller against the longitudinal chamber causes a third order axial vibration which is known as shudder. As the angle of the joint increases, the sliding action increases and thus the shudder increases. Depending upon the vehicles design, this shudder vibration can become noticeable and objectionable to the people riding in the vehicle.

One method of reducing this shudder phenomenon is to separate the components within the joint which have the responsibility for allowing the joint to go to angle from those which allow the joint to plunge. If the plane of the roller is allowed to remain substantially in the plane of the longitudinal chamber, the sliding of the roller during plunging of the joint would be minimized.

With the sliding of the roller with respect to the longitudinal chamber minimized, the shudder phenomenon would be reduced.

Accordingly it is desirous to have a tripod joint assembly with internal components which separate the responsibility of providing angular and plunging movement of the tripod joint.

SUMMARY OF THE INVENTION

The present invention provides the art with a tripod joint which separates the internal components within the joint responsible for the angular and plunging movement of the joint. This separation of responsibilities allows the plane of the roller to remain substantially within the plane of the longitudinal chamber of the outer member.

From the following detailed description, drawings and subjoined claims, other objects and advantages of the present invention will become apparent to those skilled in the art.

DETAIL DESCRIPTION OF THE PREFERRED EMBODIMENT

Figure 1:
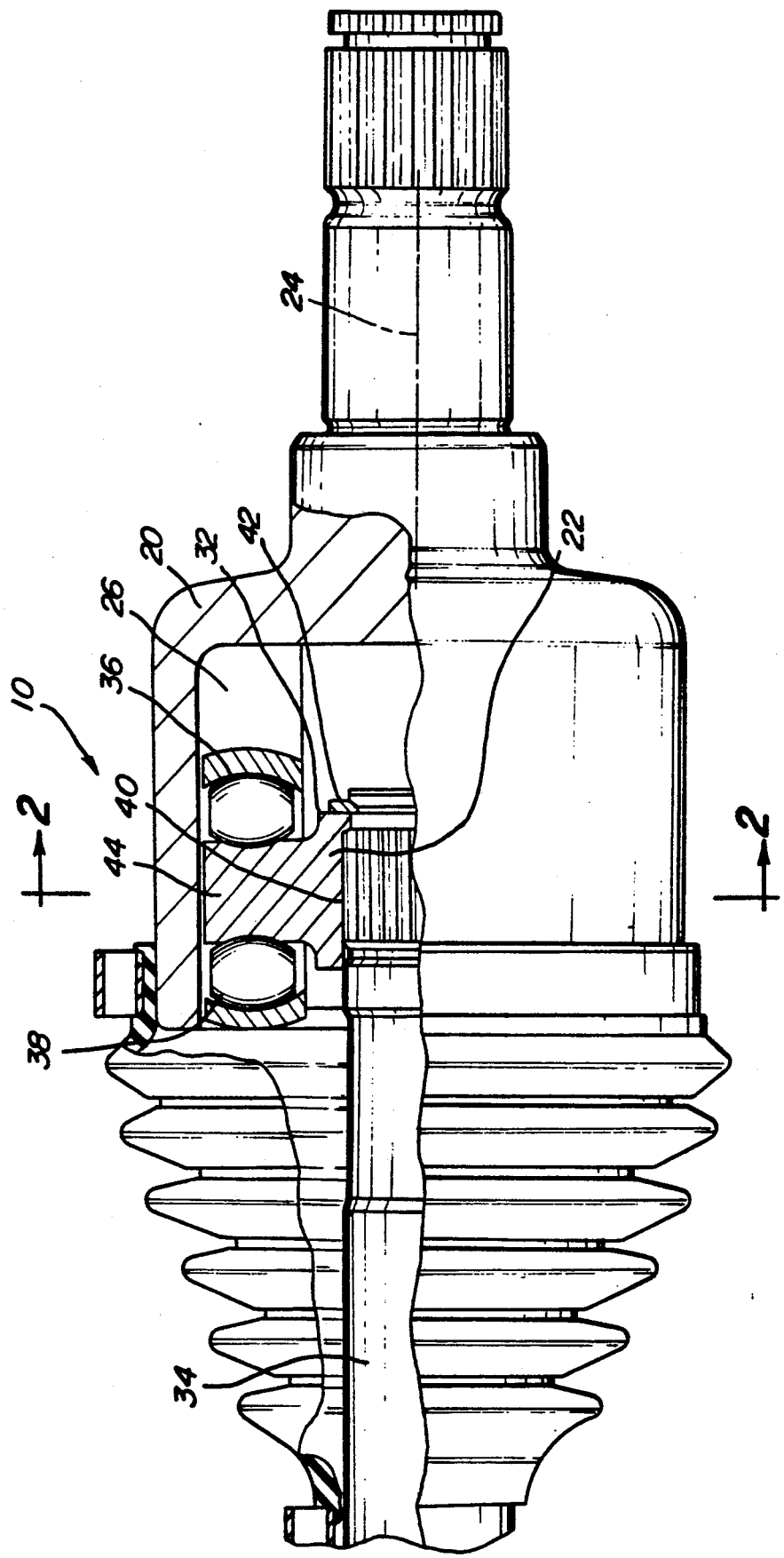
FIG. 1 is a side elevation view, partially in cross section, of a tripod constant velocity joint assembly in accordance with the present invention.
Figure 2:
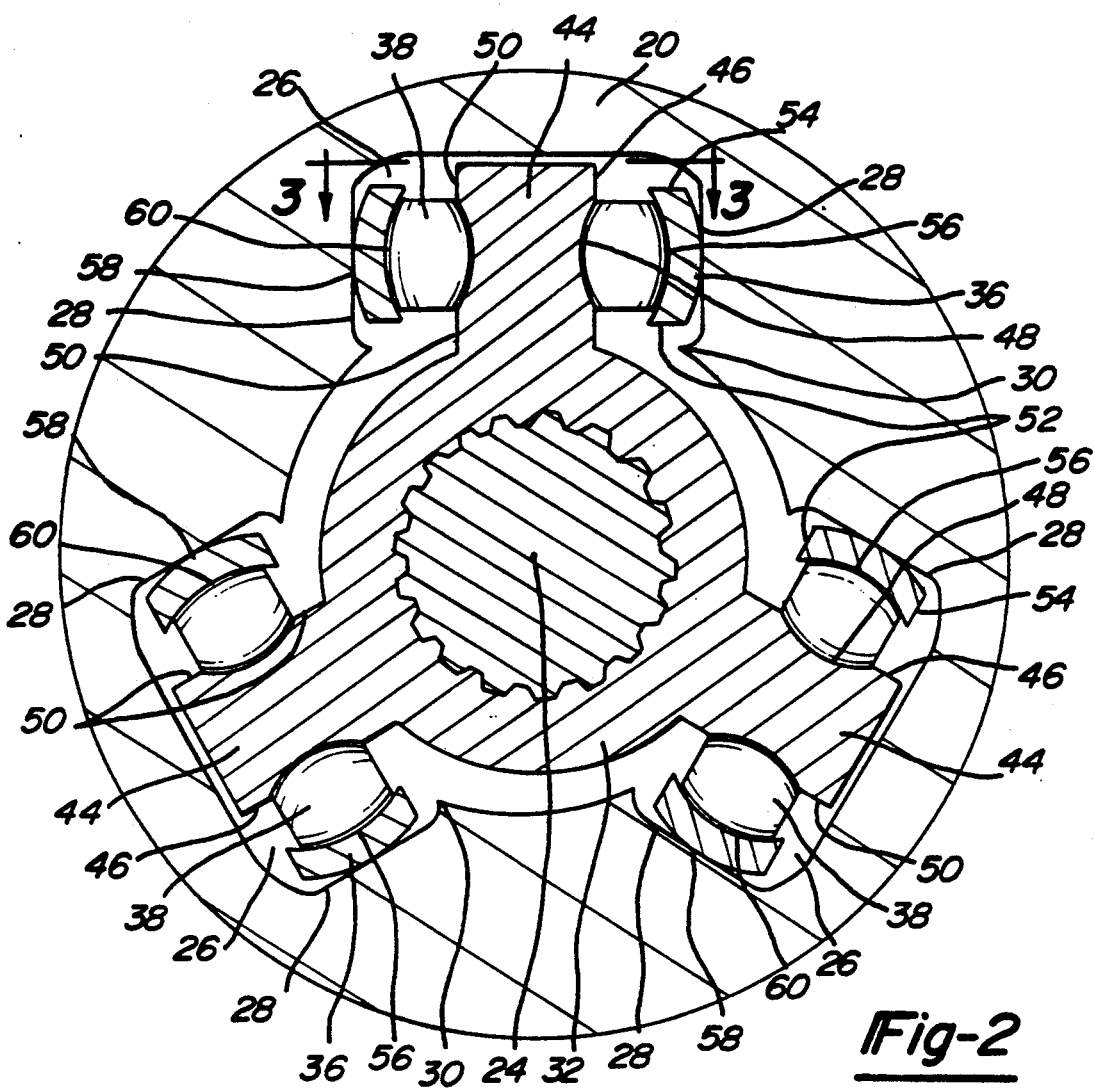
FIG. 2 is a sectional view of FIG. 1 along line 2—2 thereof.
Figure 3:
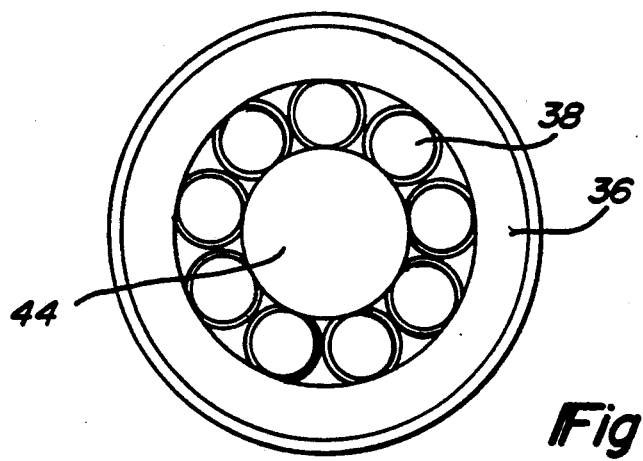
FIG. 3 is a view of FIG. 2 in direction of arrows 3—3 thereof.

An anti-shudder tripod constant velocity joint in accordance with the present invention is shown in FIGS. 1, 2, and 3 and is designated by the reference numeral 10. The telescopic tripod universal joint 10 has an outer member 20 and an inner joint assembly 22.

The outer member 20 is a bell shaped housing and is rotatable about an axis 24. The outer member 20 has three longitudinal chambers 26 formed in its interior wall. The chambers 26 are generally parallel to the axis 24. Each of the longitudinal chambers 26 are defined by opposing longitudinal planar sidewalls 28 which are generally parallel to the axis 24. Each of the longitudinal sidewalls 28 includes a longitudinal guideway 30.

The inner joint assembly 22 includes spider member 32, shaft 34, three outer rollers 36, and a plurality of roller bearings 38. The spider member 32 may be integral or separate with the shaft 34. When the spider member 32 is separate from the shaft 34, it is secure by spline means 40 and snap ring 42.

The spider member 32 has three equally circumferentially spaced and radially extending trunnions 44. Each trunnion 44 is adapted to extend into one of the chambers 26 as shown in FIG. 2. The trunnions 44 have an exterior surface 46 which consists of an annular concave portion 48 and two cylindrical sections 50. The annular concave portion 48 lies between the two cylindrical sections 50 as shown in FIG. 2.

Each of the three outer rollers 36 is positioned around a respective trunnion 44. The outer rollers 36 each have a pair of lateral ends 52 and 54 with an inner partial spherical surface 56 and an outer partial spherical surface 58 between the lateral ends 52 and 54. The inner spherical surface 56 provides a bearing surface for the roller bearings 38 as will be described herein. The outer partial spherical surface 58 is in rolling contact with the longitudinal sidewall 28 of the outer joint member 20.

The plurality of roller bearings 38 are journaled between the outer roller 36 and the trunnion 44. The roller bearings 38 have a barrel shaped exterior surface 60. The exterior surface 60 is in rolling contact with the annular concave portion 48 of the trunnion 44 and the inner spherical surface 56 of the outer roller 36.

The longitudinal guideway 30 retains the outer roller 36 in the chamber 26. The outer roller is thus allowed to move only in a direction which is generally parallel to the axis 34. Some skewing of the outer roller 36 relative to the chamber 26 will occur. This is due to the fact that the outer partial spherical surface 58 of the outer roller 36 is allowed to move in a direction parallel to the axis of the trunnion 44 against the planar sidewall 28. This movement is necessary to allow the tripod joint assembly to angulate. The skewing of the outer roller 36 relative to the chamber 26 is kept to a minimum by contact with the longitudinal guideway 30.

Figure 4:
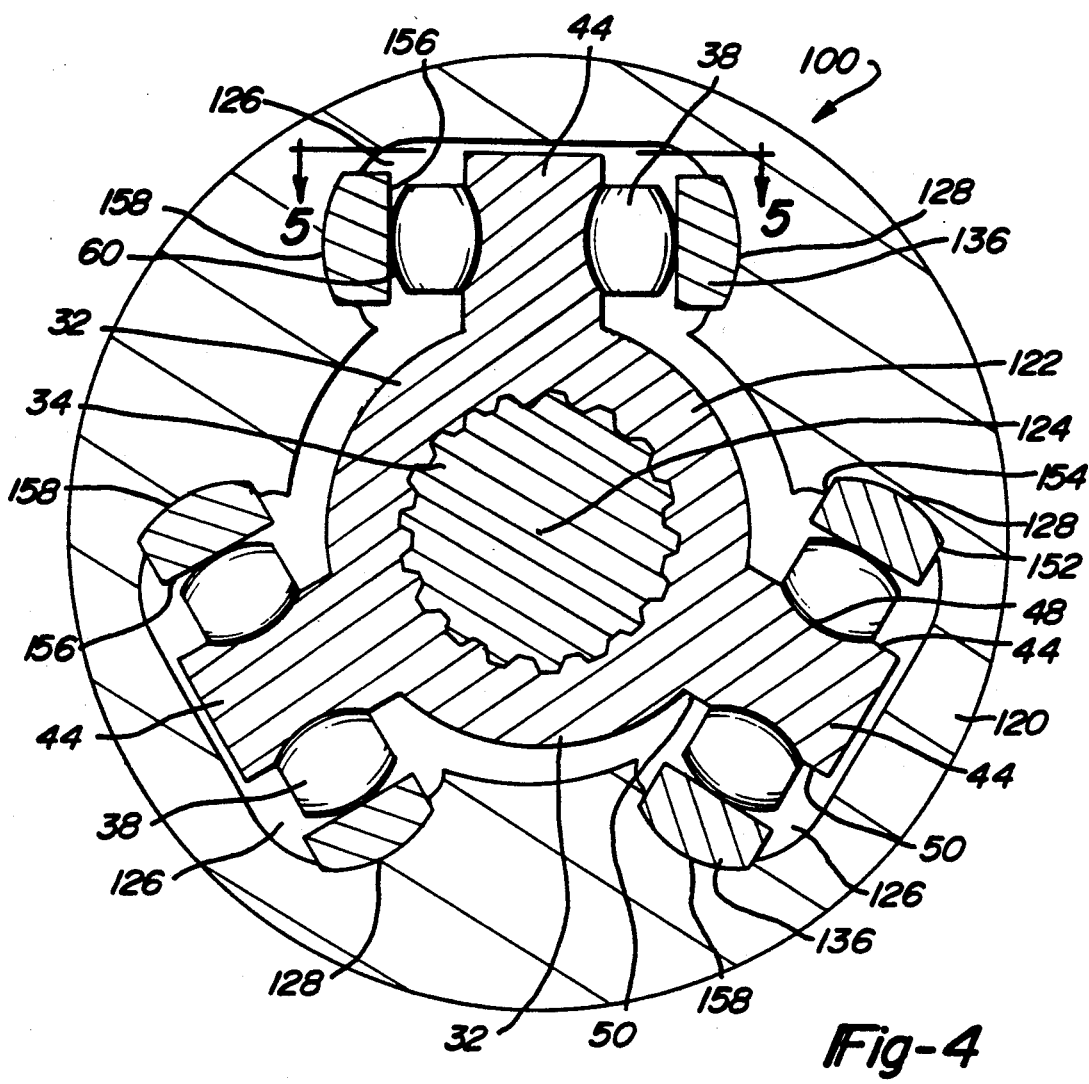
FIG. 4 is a sectional view like that of FIG. 2 of a tripod assembly according to another embodiment of the present invention.
Figure 5:
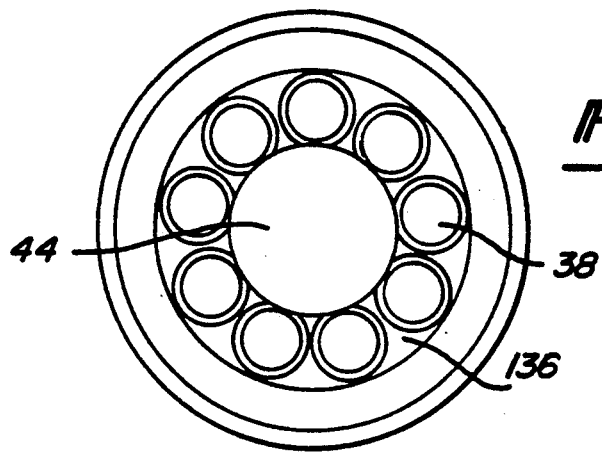
FIG. 5 is a view of FIG. 4 in direction of arrows 5—5 thereof.

FIGS. 4 and 5 show another embodiment of the present invention. It is designated by the reference number 100. In the discussion of FIGS. 4 and 5, the elements which are the same as those shown in FIGS. 1, 2 and 3 are designated with the same reference numerals. The telescopic tripod universal joint 100 has an outer member 120 and an inner joint assembly 122.

The outer member 120 is a bell shaped housing and is rotatable about an axis 124. The outer member 120 has three longitudinal chambers 126 formed in its interior wall. The chambers 126 are generally parallel to the axis 124. Each of the longitudinal chambers 126 are defined by opposing longitudinal sidewalls 128 which are generally parallel to the axis 124. The longitudinal sidewalls 128 are shaped to compliment the outer partial spherical surface 158 of the outer rollers 126 as will be described herein.

The inner joint assembly 122 includes spider member 32, shaft 34, three outer rollers 136 and a plurality of roller bearings 38. The spider member 32 may be integral or separate with the shaft 34 as described in the embodiment shown in FIGS. 1, 2 and 3.

The spider member 32 has three equally circumferentially spaced and radially extending trunnions 44. Each trunnion 44 is adapted to extend into one of the chambers 126 as shown in FIG. 4. The trunnions 44 have an exterior surface 46 which consists of an annular concave portion 48 and two cylindrical sections 50. The annular concave portion 48 lies between the two cylindrical sections 50 as shown in FIG. 4.

Each of the three outer rollers 136 is positioned around a respective trunnion 44. The outer rollers 136 each have a pair of lateral ends 152 and 154 with an inner cylindrical surface 156 and an outer partial spherical surface 158 between the lateral ends 152 and 154. The inner cylindrical surface 156 provides a bearing surface for the roller bearings 38 as will be described herein. The outer partial spherical surface 158 is in rolling contact with the longitudinal sidewall 128 of the outer joint member 120.

The plurality of roller bearings 38 are journaled between the outer roller 136 and the trunnion 44. The roller bearings 38 have a barrel shaped exterior surface 60. The exterior surface 60 is in rolling contact with the annular concave portion 48 of the trunnion 44 and the inner cylindrical surface 156 of the outer roller 136.

The longitudinal sidewall 128 is shaped to trap the outer roller 136 and only allows for movement in a direction which is generally parallel to the axis 124. The outer roller 136 is thus prevented from skewing relative to the longitudinal chamber 126.

Angular movement of the joint is accommodated by both angular and translational movement of the plurality of roller bearings 38 relative to the outer roller 136.

Figure 6:
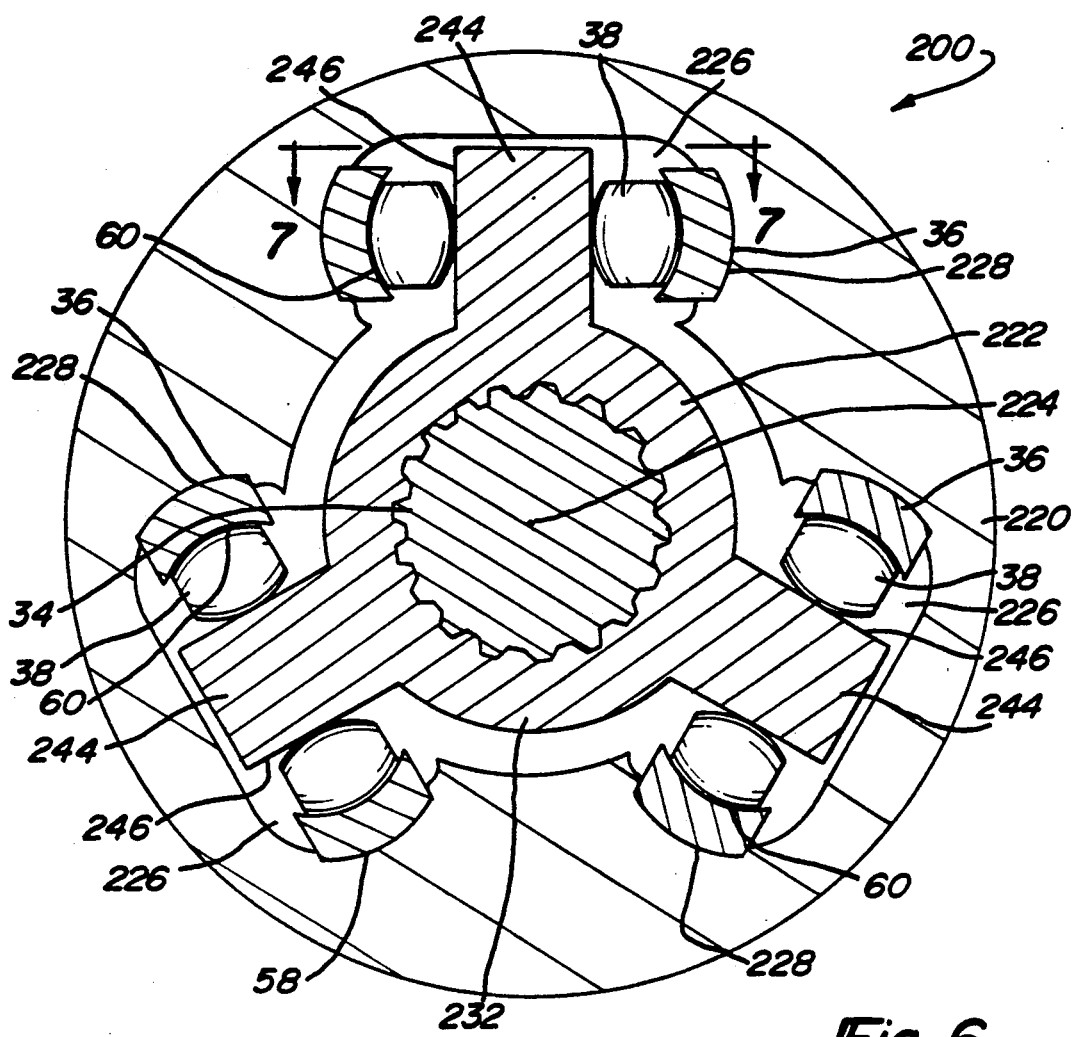
FIG. 6 is a sectional view like that of FIG. 2 of a tripod assembly according to another embodiment of the present invention.
Figure 7:
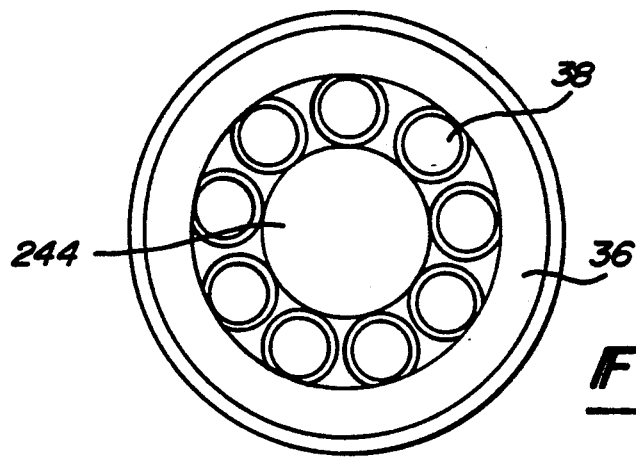
FIG. 7 is a view of FIG. 6 in direction of arrows 7—7 thereof.

FIGS. 6 and 7 show another embodiment of the present invention. It is designated by the reference numeral 200. In the discussion of FIGS. 6 and 7, the elements which are the same as those shown in FIGS. 1, 2 and 3 are designated with the same reference numerals. The telescopic tripod universal joint 200 has an outer member 220 and an inner joint assembly 222.

The outer member 220 is a bell shaped housing an is rotatable about an axis 224. The outer member 220 has three longitudinal chambers 226 formed in its interior wall. The chambers 226 are generally parallel to the axis 224. Each of the longitudinal chambers 226 are defined by opposing longitudinal sidewalls 228 which are generally parallel to the axis 224. The longitudinal sidewalls 228 are shaped to compliment the outer partial spherical surface 58 of the outer rollers as will be described herein.

The inner joint assembly 222 includes spider member 232, shaft 34, three outer rollers 36 and a plurality of roller bearings 38. The spider member 232 may be integral or separate with the shaft 34 as described in the embodiment shown in FIGS. 1, 2 and 3.

The spider member 232 has three equally circumferentially spaced and radially extending trunnions 244. Each trunnion 244 is adapted to extend into one of the chambers 226 as shown in FIG. 6. The trunnions 244 have a cylindrical exterior surface 246.

The outer rollers 36 and the roller bearings 38 are the same as those described for FIGS. 1, 2 and 3. The above description of these components also applies to this embodiment.

Each of the three outer rollers 36 is positioned around a respective trunnion 244. The outer partial spherical surface 58 is in rolling contact with the longitudinal sidewall 228 of the outer joint member 220.

The plurality of roller bearings 38 are journaled between the outer roller 36 and the trunnion 244. The roller bearings 38 have a barrel shaped exterior surface 60. The exterior surface 60 is in rolling contact with the cylindrical exterior surface 246 of the trunnion 244 and the inner partial spherical surface 56 of the outer roller 36.

The longitudinal sidewall 228 is shaped to trap the outer roller 36 and only allow for movement in a direction which is generally parallel to the axis 224. The outer roller 236 is thus prevented from skewing relative to the longitudinal chamber 226.

Angular movement of the joint is accommodated by both angular and translational movement of the plurality of roller bearings 38 relative to the trunnion 244.

Figure 8:
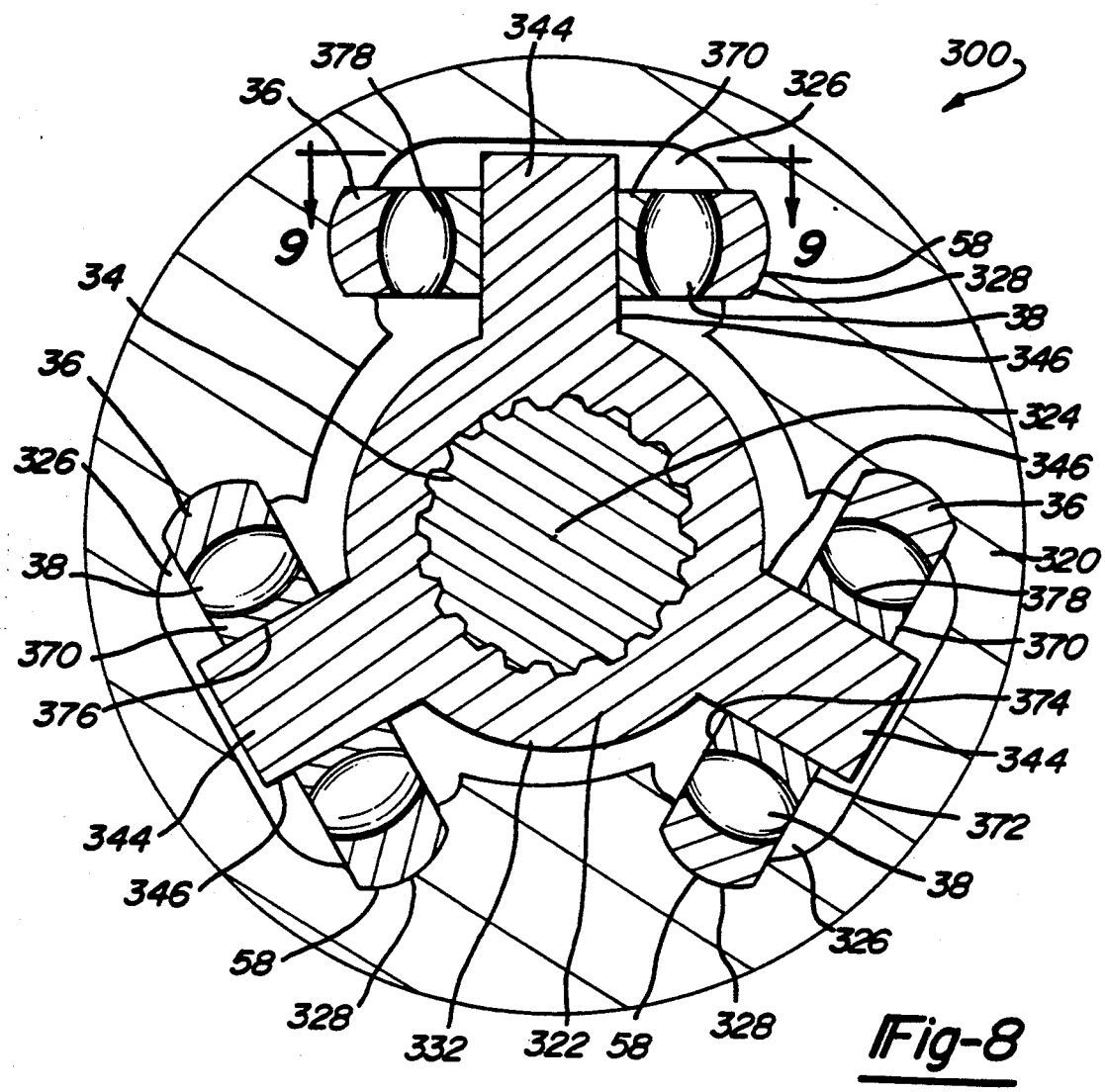
FIG. 8 is a sectional view like that of FIG. 2 of a tripod assembly according to another embodiment of the present invention.
Figure 9:
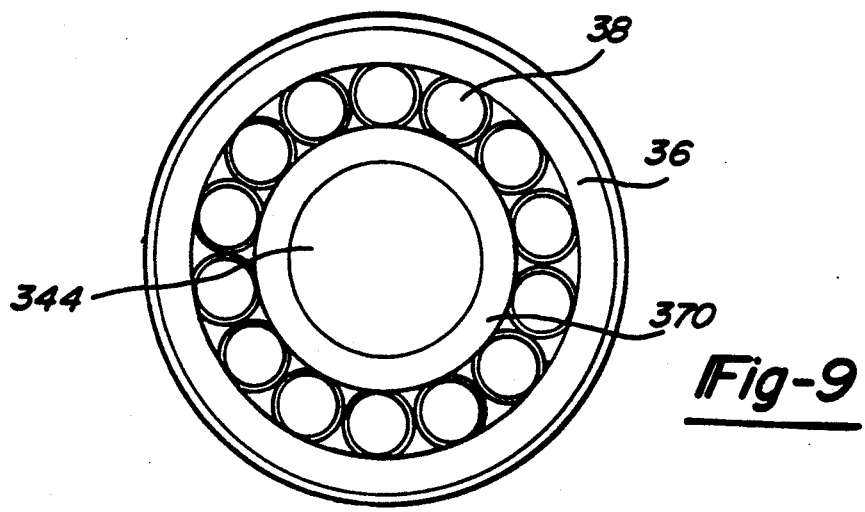
FIG. 9 is a view of FIG. 8 in direction of arrows 8—8 thereof.

FIGS. 8 and 9 show another embodiment of the present invention. It is designated by the reference numeral 300. In the discussion of FIGS. 8 and 9, the elements which are the same as those shown in FIGS. 1, 2 and 3 are designated with the same reference numerals. The telescopic tripod universal joint 300 has an outer member 320 and an inner joint assembly 322.

The outer member 320 is a bell shaped housing and is rotatable about an axis 324. The outer member 320 has three longitudinal chambers 326 formed in its interior wall. The chambers 326 are generally parallel to the axis 324. Each of the longitudinal chambers 326 are defined by opposing longitudinal sidewalls 328 which are generally parallel to the axis 324. The longitudinal sidewall 328 are shaped to compliment the outer partial spherical surface 58 of the outer rollers as will be described herein.

The inner joint assembly 322 includes spider member 332, shaft 34, three outer rollers 36, three inner rollers 370 and a plurality of roller bearings 38. The spider member 332 may be integral or separate with the shaft 34 as described in the embodiment shown in FIGS. 1, 2 and 3.

The spider member 332 has three equally circumferentially spaced and radially extending trunnions 344. Each trunnion 344 is adapted to extend into one of the chambers 326 as shown in FIG. 8. The trunnions 344 have a cylindrical exterior surface 346.

The outer rollers 36 and the roller bearings 38 are the same as those described for FIGS. 1, 2 and 3. The above description of these components also applies to this embodiment.

Each of the three inner rollers 370 is positioned around a respective trunnion 344. The inner rollers 370 each have a pair of lateral ends 372 and 374 with an inner cylindrical surface 376 and an outer partial spherical surface 378 between the lateral ends 372 and 374. The inner cylindrical surface 376 is in sliding contact with the exterior cylindrical surface 346 of the trunnion 344. The outer partial spherical surface 378 is in rolling contact with the roller bearings 38 as will be described herein.

Each of the three outer rollers 36 is positioned around a respective inner roller 370. The outer partial spherical surface 58 of the outer roller 36 is in rolling contact with the longitudinal sidewall 328 of the outer joint member 320.

The plurality of roller bearings 38 are journaled between the outer roller 36 and the inner roller 370. The exterior surface 60 is in rolling contact with the partial spherical surface 378 of the inner roller 370 and the inner partial spherical surface 56 of the outer roller 36.

The longitudinal sidewall 328 is shaped to trap the outer roller 36 and only allow for movement in a direction which is generally parallel to the axis 324. The outer roller 36 is thus prevented from skewing relative to the longitudinal chamber 326.

Angular movement of the joint is accommodated by angular movement of the roller bearings 38 relative to the inner and outer rollers 370 and 36 combined with translational movement of the inner roller 370 relative to the trunnion cylindrical surface 346.

While the above description constitutes the preferred embodiments of the present invention, it will be appreciated that the invention is susceptible to modification variation and change without departing from the proper scope and fair meaning of the accompanying claims.

What is claimed is:

1. A universal joint comprising:
    an outer joint member having a plurality of circumferentially spaced longitudinally extending chambers, each chamber having a curved pair of oppositely disposed longitudinal sidewalls;
    an inner joint member disposed within said outer joint member having a plurality of circumferentially spaced radially outwardly extending trunnions, each trunnion extending into a respective chamber of said outer joint member and having an exterior surface positioned between said pair of oppositely disposed longitudinal sidewalls of said respective chamber into which it extends;
    a plurality of annular outer rollers, each annular outer roller positioned around a specific trunnion of said plurality of trunnions, said outer roller having an axis of rotation, an exterior surface and an interior surface, said exterior surface in rolling contact with at least one of said pair of oppositely disposed longitudinal sidewalls of said respective chamber, said interior surface having a pair of lateral edges and being cylindrical between said lateral edges, said axis of rotation of each of said annular outer rollers remaining generally perpendicular to a plane defined by said pair of oppositely disposed longitudinal sidewalls during angular movement of said joint;
    a plurality of arrangements of roller bearings, each arrangement of roller bearings interposed between said annular outer roller and said respective trunnion, each of said arrangement of roller bearings including a plurality of roller bearings, each of said roller bearings having a barrel shaped exterior surface in rolling contact with said interior surface of said outer annular roller and said exterior surface of said respective trunnion.

2. The universal joint of claim 1 wherein said exterior surface of said plurality of outer rollers each has a pair of lateral edges and said exterior surface is curved between said lateral edges.

3. The universal joint of claim 2 wherein said exterior surface of said plurality of trunnions includes a cylindrical portion and a curved portion.

4. The universal joint of claim 1 wherein said exterior surface of said plurality of trunnions includes a cylindrical portion and a curved portion.

5. A universal joint comprising:
    an outer joint member having a plurality of circumferentially spaced longitudinally extending chambers, each chamber having a curved pair of oppositely disposed longitudinal sidewalls;
    an inner joint member disposed within said outer joint member having a plurality of circumferentially spaced radially outwardly extending trunnions, each trunnion extending into a respective chamber of said outer joint member and having a cylindrical exterior surface positioned between said pair of oppositely disposed longitudinal sidewalls of said respective chamber into which it extends;
    a plurality of annular outer rollers, each annular outer roller positioned around a specific trunnion of said plurality of trunnions, said outer roller having an axis of rotation, an exterior surface and an interior surface, said exterior surface in rolling contact with at least one of said pair of oppositely disposed longitudinal sidewalls of said respective chamber, said interior surface having a pair of lateral edges and being curved between said lateral edges, said axis of rotation of each of said annular outer rollers remaining generally perpendicular to a plane defined by said pair of oppositely disposed longitudinal sidewalls during angular movement of said joint;

a plurality of arrangements of roller bearings, each arrangement of roller bearings interposed between said annular outer roller and said respective trunnions, each of said arrangement of roller bearings including a plurality of roller bearings, each of said roller bearings having a barrel shaped exterior surface in rolling contact with said interior surface of said outer annular roller and said exterior surface of said respective trunnion.

6. The universal joint of claim 5 wherein said exterior surface of said plurality of outer rollers each has a pair of lateral edges and said exterior surface is curved between said lateral edges.

* * * * *